Dec. 25, 1951   I. POCKEL ET AL   2,579,855
VALVE
Filed June 23, 1946

INVENTORS
IRVING POCKEL
DONALD P. SMITH
By Millard F. Peare
ATTORNEYS

UNITED STATES PATENT OFFICE 2,579,855

VALVE

Irving Pöckel, Wellesley, Mass., and Donald P. Smith, Cincinnati, Ohio

Application April 23, 1946, Serial No. 664,228

1 Claim. (Cl. 251—119)

The invention described herein may be manufactured and used by or for the Government, for governmental purposes, without the payment to us of any royalty thereon.

This invention relates to a low pressure valve and more particularly to an outlet valve suitable for use on gas masks and other respiratory devices wherein leakage must be reduced to a minimum without lessening the efficiency of operation under varied conditions.

One of the main objects of this invention is to provide a cover for protection of the valve disc from mutilation.

Another object is to provide a cover for the valve disc, which will serve to define a dead air space, which limits the back-leakage air to that which has just passed through the valve.

Still another object is to provide a cover, which will increase the air flow area on the effluent side of the valve.

The device described below can be used not only in valves of masks used by military personnel, but also on commercial gas masks where low leakage and low pressure valves are required.

With the above recited and other objects in view, reference is had to the following description and accompanying drawing in which there is exhibited one example or embodiment of the invention while the claim defines the actual scope of the same.

Figure 1:
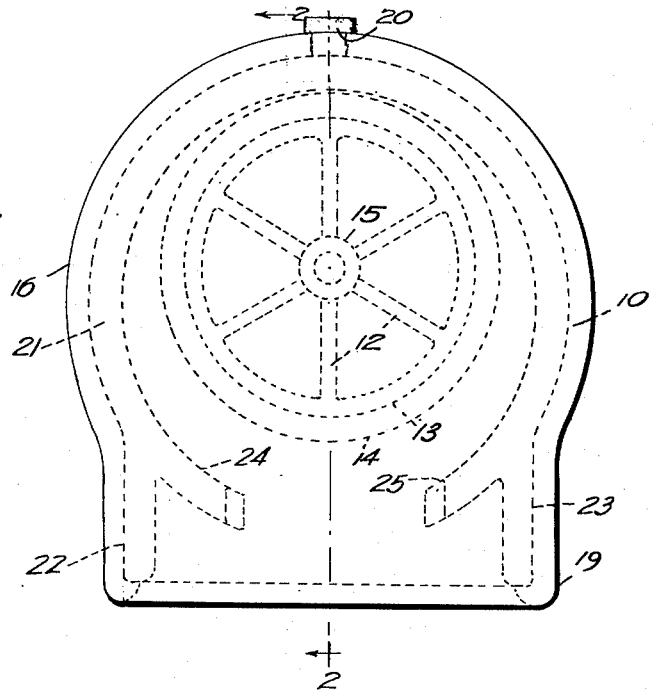
Fig. 1 is a front elevation of the valve with the cover in position.
Figure 2:
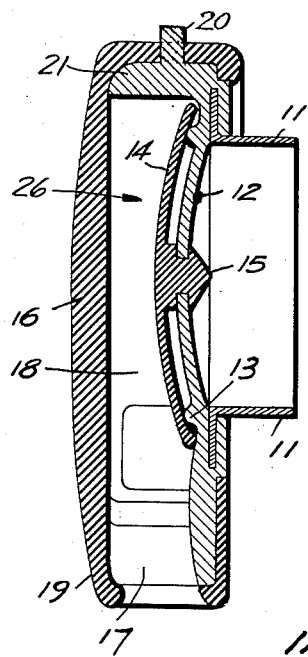
Fig. 2 is a longitudinal cross section of the assembly in line 2—2 of Figure 1.

Referring to the drawings, the preferred form of the gas mask unit of this invention makes use of a rigid body or frame 10 which serves as a support for a resilient cover 16 of suitable material, such as rubber. This cover is disposed in such a way as to restrict the effluent gas and divert it towards the lower extension of the cover 16, shown at 17.

The flexible valve disc 14 serves as the interrupter of the reverse flow of gas, and is of special construction hereinafter described.

On the effluent side of the disc 14 an outlet opening 17 is located in the lower extension of cover 16 and somewhat beyond the periphery of the assembly. Thus a hereafter more fully described air space 18 is formed, the utility of which will be described hereinafter.

The rigid body or frame 10 has a tubular extension or conduit 11 through which the exhaled air is passed towards the spider support 12 having a circular peripheral ridge 13.

The valve disc 14 is molded of suitable material, such as rubber. It is provided with a button-like member 15, which is wedged in the center hole of the spider 12. The disc 14 rests on the circular ridge or bead which forms a seat ring 13 and is generally supported by the center button-like member 15. This allows the flexible portion of the disc to collapse slightly when back pressure is applied. This alternate collapsing and relaxing of the disc 14 in the cycle of breathing, causes a constant change in the angle of contact of the disc with the seat ring 13 imparting a wiping action of the disc against the seat which, together with the relatively swift passage of air over the same surfaces aids in removing particles of dirt which would otherwise cause leakage.

In operation the cover 16 is stretched over the frame 10 and is partially held in place by a boss located on the top of the frame 10 at 20.

The cover 16 is generally circular and is equipped with an extended lower portion 19, serving as an exhaust. It is mounted in front and away from the valve 14 and the seat ring 13, so that the exhaust section 19 of the cover is at the greatest distance from the center of the valve disc 14. This design increases the air flow area on the effluent side of the valve disc, thus decreasing the hazard of back leakage of contaminated or polluted air through the valve disc during respiration.

A particular advantage of this construction is that it permits use of a valve cover considerably smaller than would be necessary if a cover which was concentric with the valve disc were used with the single exhaust opening.

The bead 13 constituting the ridge, which resembles the rounded end of a tube, is employed so that the valve disc 14 does not seat on the outer peripheral edges of the disc. This particular design makes it possible for the flexible valve disc to be pressed against the bead 13 in a manner which will break ice, which may have been formed on it.

From the foregoing description and the accompanying drawings, it will be readily seen that we have provided a very compact, unique and useful low pressure air outlet valve unit which is particularly adapted for either entirely eliminating or at the very least minimizing the back leakage of toxic gases into the gas mask.

The problem of preventing such leakage in a compact unit adapted to be used with a gas mask has long been recognized by the Chemical Corps of the U. S. Army which fully appreciates the danger inherent in introduction of the toxic gases into the gas masks and particularly so, when these gases are, as the new "nerve gases" are, both extremely potent and practically odorless.

A means has heretofore been devised by the applicants for preventing this back leakage but it involves the use of a hood placed over both the gas mask and the head of the wearer and then loosely drawn and tightened or buckled about the neck of the wearer in such a manner as to permit but at the same time restrict the passage of the exhaled gas between the neck of the wearer and the neck of the hood in such a manner that a slightly higher than atmospheric pressure is maintained within the hood to prevent the undesired back leakage. This gas mask hood however, has certain obvious disadvantages in that the wearer of the mask must use an additional set of transparent lenses or windows, upon which the moisture in the breathed air condenses and render foggy and in that the hood particularly in hot weather may be extremely uncomfortable to wear. In addition to this, the hood must be so bulky as to interfere, to a certain extent at least, with the freedom required of a soldier in action. Another disadvantage inherent in this hood is that it can be twisted by the enemy in such a manner that the soldier cannot see what his opponent is doing.

Briefly, this unit comprises a substantially U-shaped frame 10 including a curved main body portion 21, two straight parallelly extending spaced apart leg portions 22, 23 and two integral oppositely positioned inwardly extending convergent arm portions 24, 25 which are well adapted for detarding the flow of air in said unit between said main body and arm portions, a flexible shock resistant covering encircling said frame in a manner providing an exhaled air chamber 26 within said main body portion and a tubular exhaled air conduit having an air outlet 17 for directing exhaled air out of said valve unit, a tubular exhaled air inlet and a valve mounted in said frame between said chamber and air inlet including a flexible diaphragm 14 and a spider integral with said frame provided with a circular valve seat consisting of a circular rib having a shorter diameter than said diaphragm said diaphragm being adapted to move transversely over said rib and wipe the same during the inhalation phase.

In operation the valve disc 14 moves toward the cover 16 during the exhaling to permit the breathed-out air to escape against the cover 16 and be diverted towards the opening 17. During the inhaling the valve disc 14 is closed thus shutting off the entry of contaminated air. However, between the exhaling and the inhaling steps the valve disc 14 is slightly open for a small fraction of a second, during which time a trace of contaminated air might enter the interior of the gas mask, thus causing gas casualties. However, with the cover 16 of this invention in place, even if there is a tendency of the valve disc to leak slightly, the entry of the contaminated air is made impossible since it is blocked off by the exhaled air in the immediate vicinity of the valve disc by the cover 16 of this invention. That is, whatever leakage occurs will be of exhaled air, rather than from the contaminated atmosphere surrounding the wearer.

We claim:

In combination, a gas mask exhalator valve including a valve member and a frame said frame being longer in length than in width and having a closed end portion and an oppositely positioned open end portion, a resilient shock resistant covering encircling said frame and forming, in combination with said frame an exhaled air conduit having an exhaled air outlet, a tubular exhaled air inlet operatively connected to the closed end portion of the frame and extending at right angles to said exhaled air conduit; said valve member including an arcuate spider mounted in the closed end portion of said frame adjacent to the inner end of said exhaled air inlet and a recessed hub portion, and a peripheral portion operatively connected to said hub portion by spokes; said peripheral portion having an annular rib concentric with said hub, and a flexible disc flexibly secured at the center of said spider by an integral projection threaded through said hub portion and being larger in diameter than said rib and adapted by reason of its flexibility and greater size to substantially overlap and wipe said rib during inhalation.

IRVING PÖCKEL.
DONALD P. SMITH.

REFERENCES CITED

The following references are of record in the file of this patent:

UNITED STATES PATENTS

| Number | Name | Date |
|---|---|---|
| 2,312,714 | Herbin | Mar. 2, 1943 |
| 2,382,364 | Yant | Aug. 14, 1945 |
| 2,465,973 | Bulbulian | Mar. 29, 1949 |

FOREIGN PATENTS

| Number | Country | Date |
|---|---|---|
| 558,305 | France | of 1923 |
| 795,527 | France | of 1936 |